United States Patent
Ciccarello

(10) Patent No.: US 8,696,235 B2
(45) Date of Patent: Apr. 15, 2014

(54) PRECAST INTERCONNECTABLE CONCRETE PAVER BLOCK FOR CONSTRUCTING PAVING SURFACES

(75) Inventor: Charles Ciccarello, St-Jean-sur-Richelieu (CA)

(73) Assignee: Techo-Bloc Inc., St. Hubert (CA)

( * ) Notice: Subject to any disclaimer, the term of this patent is extended or adjusted under 35 U.S.C. 154(b) by 0 days.

(21) Appl. No.: 13/424,673

(22) Filed: Mar. 20, 2012

(65) Prior Publication Data

US 2013/0089372 A1   Apr. 11, 2013

(30) Foreign Application Priority Data

Oct. 11, 2011 (CA) ..................................... 2754920

(51) Int. Cl.
*E01C 5/00* (2006.01)

(52) U.S. Cl.
USPC ................................. 404/38; 404/34; 52/603

(58) Field of Classification Search
USPC ................. 404/29, 34–38, 40–42; 52/603
See application file for complete search history.

(56) References Cited

U.S. PATENT DOCUMENTS

| | | | |
|---|---|---|---|
| 1,113,784 A | 10/1914 | Higman | |
| 5,046,887 A | 9/1991 | Fontana et al. | |
| 5,181,793 A | 1/1993 | Dekel | |
| 5,400,561 A | 3/1995 | Metten | |
| 5,462,382 A | 10/1995 | Sauerwein et al. | |
| 5,503,498 A * | 4/1996 | Scheiwiller | 404/34 |
| 5,518,336 A | 5/1996 | Arm et al. | |
| D389,926 S * | 1/1998 | Barth et al. | D25/113 |
| 5,902,069 A * | 5/1999 | Barth et al. | 404/34 |
| 6,270,663 B1 | 8/2001 | Happel | |
| 6,705,797 B1 * | 3/2004 | Wada | 404/38 |
| 6,908,256 B1 | 6/2005 | Humphries et al. | |
| 7,144,185 B2 | 12/2006 | Messerschmidt et al. | |
| 7,264,418 B1 | 9/2007 | Houck | |
| 7,270,497 B2 * | 9/2007 | Von Langsdorff | 404/39 |
| 7,393,153 B2 | 7/2008 | Woodson et al. | |
| 7,425,106 B2 * | 9/2008 | Altmann et al. | 404/39 |
| 7,556,450 B2 | 7/2009 | Shimono et al. | |
| 7,637,694 B1 | 12/2009 | Musser | |
| 7,810,291 B2 | 10/2010 | McPherson | |
| 2004/0228684 A1 * | 11/2004 | Lombardo | 404/41 |
| 2008/0075533 A1 * | 3/2008 | Fournier | 404/41 |

\* cited by examiner

*Primary Examiner* — Raymond W Addie
(74) *Attorney, Agent, or Firm* — Norton Rose Fulbright Canada LLP

(57) ABSTRACT

A precast concrete solid core paver block which has a first pair of flat parallel side walls and a second pair of transverse parallel side walls. One side has at least one block engaging projection in one or more portions thereof and spaced between a top and bottom surface of the paver block. The opposed side wall has a slot to receive in close sliding fit the at least one block engaging projection of an adjacent one of the paver blocks for side-by-side interengagement while permitting horizontal displacement of the adjacent paver block and the block engaging projection thereof while preventing vertical displacement thereof wherein a top face of the paver blocks lie in a substantially common planar surface. Spacers form open joints about each block in portions thereof to communicate with a support bed and form a permeable paved surface.

26 Claims, 8 Drawing Sheets

PRECAST INTERCONNECTABLE CONCRETE PAVER BLOCK FOR CONSTRUCTING PAVING SURFACES

TECHNICAL FIELD

The present invention relates to an interconnectable precast concrete paver block for constructing paving surfaces and wherein the paver blocks are interlocked with one another to distribute load forces.

BACKGROUND ART

When constructing large asphalt paved parking areas for large shopping malls or other purpose, such as road work, it is often mandatory to construct drainage areas and retention ponds for collecting rain water as the earth under the pavement no longer absorbs and filters water causing water to accumulate in areas adjacent to the pavement. Such retention ponds connect to associated infrastructure to direct water thereto. It is essential to conform to city regulations where storm water management is in place. In order not to oversupply storm sewers with accumulated water from large paved parking areas, there is required the construction of rain water storage basins. The water in these basins is released in the sewer system in a controlled manner. These infrastructures are very costly and require land utilization for the construction of these water retention basins which adds to costs and further reduces land usage for parking or other structures.

Another disadvantage of large paved areas is that the pavement, which is usually asphalt, produces excess heat when exposed to the sun and often this heat infiltrates into the adjacent building structures and therefore more energy is necessary to cool these structures. Further, because the asphalt does not conduct water it will accumulate water in depression areas thereof and this is a nuisance to the users of the parking spaces. Still further, because parking areas are used by automobiles, there are gasoline or oil spills on the asphalt as well as rubber marks from the automobile tires and these will contaminate the water which is channeled to the retention basins and released in the city waterworks, streams, and rivers. They could also pollute drinking water. The asphalt itself also produces undesirable chemicals which dilute in water and add to the above pollutants. Asphalt also cracks and heaves when water infiltrates into its sub-surface and freezes, making the asphalt surface unsightly and hazardous.

It is also well known in the art to construct paving surfaces, such as driveways in residential developments or elsewhere with precast concrete paving stones. These stones are usually laid side-by-side and some of these stones have peculiar interlocking shapes that mesh with one another to interlock to prevent lateral displacement. These paving stones are also installed on aggregates which have fines in it to form a compact upper surface to support the paving stones. The stones are usually in close side-by-side contact to prevent water to seep between the stones not to disturb the aggregate foundation. However, when vehicles are displaced over these paving stones, often the stones will separate from one another due to lateral twisting force applied thereto, such as when a vehicle tire turns on the surface of a stone, as each of these paving stones are not interconnected together in the vertical plain. Because these stones are not connected in the vertical plane, i.e., do not form a monolithic structure, with the constant displacement of heavy traffic thereon, the paving surface does not remain perfectly flat and depressions form therein making it unsightly. Also, when there are depressions, the top side edge of some of the blocks will be exposed or lie above adjacent blocks. Such exposed block edges are hazardous to people who can trip over these edges. Also, in cold climates subject to snow, the pavement is often damaged by snow plows wherein the plow catches these edges and often causes considerable damage to the pavement requiring expensive repair.

In an attempt to overcome the above-mentioned problems, some paving areas are constructed of aggregates of different stone size mixtures and this results in a pavement which has an unstable surface, which produces dust and which requires maintenance for maintaining a uniform surface. Such aggregate parking areas are also damaged by snow removal equipment. Fines in the aggregate will prevent water to percolate through the surface and potholes will form. Permeable pavements constructed of aggregate have not been popular and are not a viable solution to the above-mentioned problems.

An advantage of a paved surface constructed with the precast interconnectable concrete paver blocks of the present invention is that it forms a monolithic structure wherein the top surface of the blocks lies in common flat plane with the blocks interconnected together side-by-side. The blocks are also spaced from one another and form open-joint areas for water to seep to its support bed to form a permeable surface for water to percolate through its aggregate permeable bed. With the interconnectable concrete blocks of the present invention, portions of the surface can be easily disassembled, for example for running underground piping for wiring after the paved surface is constructed or the placement of heating cables or conduit whereby a portion of the surface, particularly close to an entrance of a supermarket, needs to be heated to melt snow and ice. Conventional paved surfaces formed of asphalt require heavy machinery to dig ditches to install any underground piping or wiring and this is very costly. Also, the trenches dug by these excavators also need to be refilled and re-asphalted and this forms irregular surfaces developing cracks and depressions which accumulate water and create failure in the aggregate base below the pavement.

SUMMARY OF INVENTION

It is a feature of the present invention to provide a precast interconnectable concrete paver block for assembly and interconnection with other like paver blocks to form a paved monolithic surface which is flat and which substantially overcomes all of the above-mentioned disadvantages of the prior art.

Another feature of the present invention is to provide a precast interconnectable concrete paver block for assembly with other like blocks to form a permeable paved surface wherein rain water or water from melting snow quickly percolates through open-joint areas between the paver blocks to form a the permeable paved surface and wherein the infrastructures of the prior art as above-described are not necessary.

Another feature of the present invention is to provide a precast interconnectable concrete paver block which is easy to assemble with like paver blocks to form a monolithic paved surface.

Another feature of the present invention is to provide a precast interconnectable concrete paver block for assembly with other like paver blocks to form a paved surface which has a longer life span than the prior art paved surfaces as above-described.

Another feature of the present invention is to provide a precast interconnectable concrete paver block for assembly with other like paver blocks to form a permeable paved surface which is easy to repair by unskilled laborers, on site, and at low cost.

Another feature of the present invention is to provide a precast interconnectable concrete paver block for assembly with other like paver blocks to form a permeable paved surface which has a uniform planar top surface substantially free of jaggered edges and therefore safer for people walking on such surface and which is not damaged by snow plows or other machinery.

Another feature of the present invention is to provide a precast interconnectable concrete paver block for assembly with other like paver blocks to form a monolithic paved surface wherein loading on the paver blocks is distributed to adjacent blocks to distribute load forces.

Another feature of the present invention is to provide a precast interconnectable concrete paver block for assembly with other like paver blocks and wherein the paver blocks are interengaged with one another vertically and provide open-joint areas thereabout for the evacuation of water to a permeable support bed thereunder.

Another feature of the present invention is to provide a precast interconnectable concrete paver block which is moulded vertically to prevent irregular dimensions in its thickness thereby providing for a uniform planar top surface when assembled with other like paver blocks.

According to the above features, from a broad aspect, the present invention provides a precast interconnectable concrete paver block for assembly with other like paver blocks to form a paved surface. The precast concrete paver block is a solid core block which has a first pair of flat parallel side walls and a second pair of transverse parallel side walls. One side wall of the first pair of parallel side walls has at least one block engaging projection in one or more portions only thereof and spaced between a top and bottom surface of the paver block. The opposed side wall of the first pair of side walls has a slot to receive in close sliding fit the at least one block engaging projection of an adjacent one of the blocks for side-by-side interconnection while permitting horizontal displacement of the adjacent block and the engaging projection thereof while preventing vertical displacement thereof in the slot wherein a top face of the blocks lie in a substantially common planar surface. Spacer means is formed integral in a portion only of one of the first pair of flat parallel side walls. Further spacer means is integrally formed in a portion only of one side wall of the second pair of transverse parallel side walls. The concrete paver block when assembled together in interconnected engagement on a support bed providing open-joint areas thereabout extending from said top surface to said support bed.

BRIEF DESCRIPTION OF DRAWINGS

A preferred embodiment of the present invention will now be described with reference to the accompanying drawings in which.

DESCRIPTION OF PREFERRED EMBODIMENTS

Figures 1, 4:
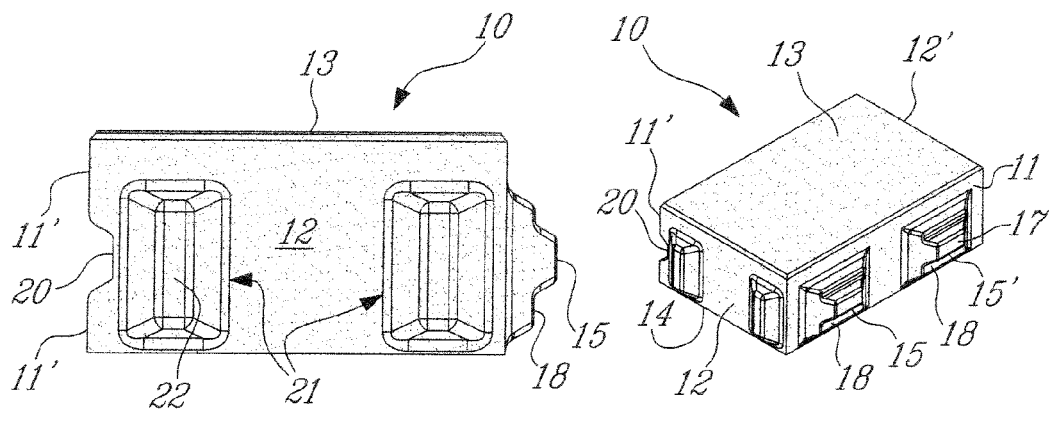
FIG. 1 is a perspective view of the precast interconnectable concrete paver block of the present invention.
FIG. 4 is a side view of one end wall showing the spacer formations thereon as well as showing in transverse cross-section the slot formed in the side wall opposed to the side wall having the block engaging projection and further illustrating the shape of the block engaging projection with a spacer formation formed integral therewith.

Referring now to the drawings and more particularly to FIGS. 1 to 4, there is shown generally at 10 the precast interconnectable concrete paver block of the present invention. The precast concrete paver block 10 is a solid core block having a first pair of flat parallel side walls, namely side walls 11 and 11', and a second pair of transverse parallel side walls, namely side walls 12 and 12'. The precast concrete paver block 10 has a flat top wall 13 and a flat bottom wall 14 extending parallel to the top wall.

The first side wall 11 of the first pair of side walls has at least one block engaging projection 15, herein two projections 15 and 15', spaced-apart from one another and aligned in a lateral plane. The block engaging projections 15 and 15' are also disposed spaced from the top and bottom walls 13 and 14 of the solid block. As can be seen, the block engaging projections 15 and 15' have opposed top and bottom tapering side walls 16 converging inwardly towards one another to a free flat end 17 thereof.

Integrally formed with the block engaging projections 15 and 15' are ridge formations 18 which constitute spacers and these together with the block engaging projections 15 and 15' are integrally formed in the side wall 11 of the block 10. The ridge formations 18 have a flat abutment surface 19 on opposed sides of the block engaging projection 15 and this is better illustrated in FIGS. 3 and 4. The ridge formation top surfaces 19 are flat abutment surfaces and they extend parallel to the flat parallel side wall 11. The block engaging projection 15 is hereinshown as recessed in the spacer ridge formation 18 whereby flat abutment surfaces 19 are disposed on opposed sides of the block engaging projection (see FIG. 3) whereby to abut the side wall portion 11" on opposed sides of a slot 20 formed in the opposed side wall 11' when the paver blocks are interengaged with one another as will be described with reference to FIGS. 5 to 7. The slot 20 is a through slot extending between the opposed end walls of the second pair of transverse parallel side walls 12 and 12' whereby the projection 15 can slide therein.

Figure 5:
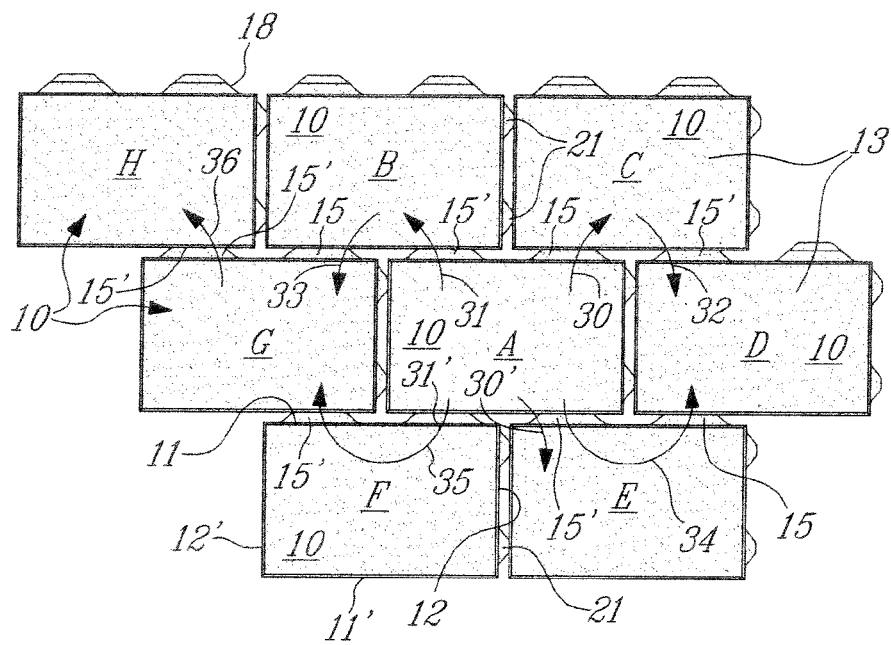
FIG. 5 is a top view showing a plurality of precast interconnectable concrete paver blocks assembled with one another to form a permeable paved surface as well as illustrating the distribution of load forces when applied on the paved surface.

As herein illustrated, one of the opposed transverse parallel side walls, herein side wall 12, is also provided with spacer formations 21 integrally formed therein. These spacer formations are formed in a common one of the side walls 12 and 12' and provide spacing of the paver blocks when interengaged with one another to form a paved surface, as will be described later. The spacer ridge formations 21 are also spaced a predetermined distance from the top wall 13 of the paver block 10 whereby to form an interrupted slot around interengaged blocks in the top portions of the blocks. The spacer ridge formations 21 are also inwardly tapering formations and provided with a flat abutment surface 22 at a free and thereof and which extend parallel to the side wall 12. The tapering edges of the spacer ridge provide better distribution of clean stone joint filler material between interengaged stones, as will be described later. These two spacer ridges 21 are spaced apart and disposed closer to the side walls 11 and 11' to provide stability of the block when assembled to form a paving surface as shown in FIG. 5. The spacer ridge formations 18 and the block engaging projections 15 also have tapering walls to facilitate the compaction of joint filler material.

Figures 2, 3:
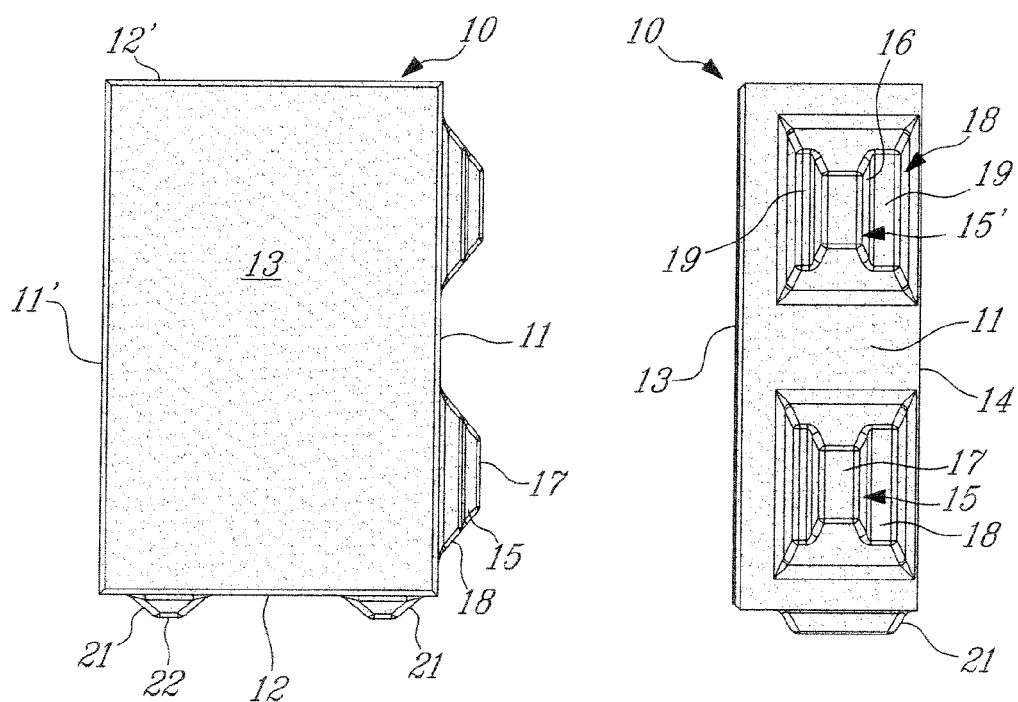
FIG. 2 is a top view of FIG. 1.
FIG. 3 is a side view of the flat side wall provided with at least one paver block engaging projection.
Figure 6:
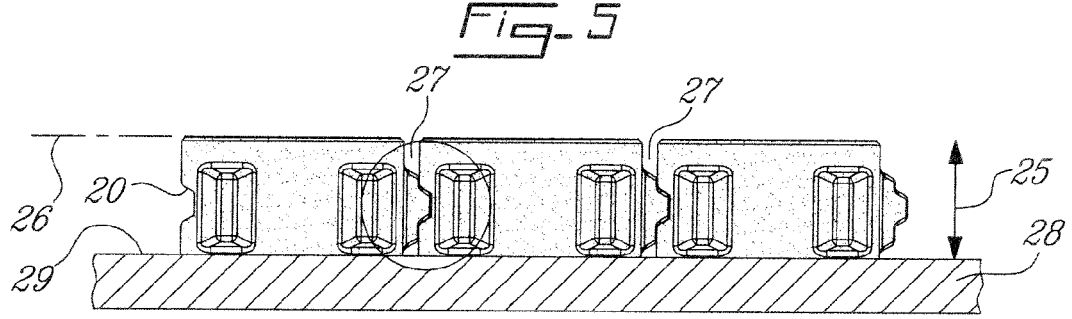
FIG. 6 is an end view showing the precast concrete paver blocks assembled with one another on a support drain bed.
Figure 7:
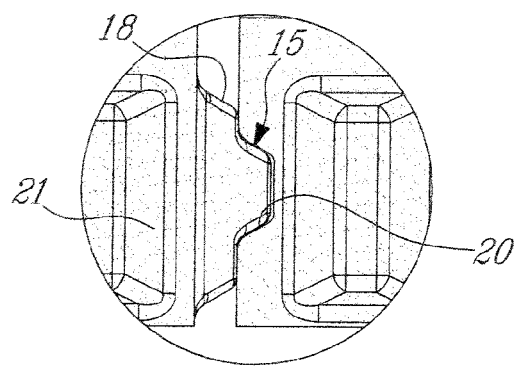
FIG. 7 is an enlarged view illustrating the interconnection of the block engaging projection in the slot of an adjacent precast concrete paver block and the engagement of the spacer ridge formation.

With reference now to FIGS. 5 to 7, there is shown in FIG. 5 a plurality of precast concrete paver blocks 10 interengaged with one another in spaced-apart relationship by the block engaging projections 15 and spacer ridge formations 18 as clearly illustrated in FIG. 7. As well, the spacer ridges 21 permit spacing between the transverse parallel side walls 12 and 12'. The through slot 20 is dimensioned and formed to receive the block engaging projection 15 in close sliding fit therein. The block engaging projection 15 is slidingly displaceable along the slot 20 to permit movement whereby to align the stones during assembly on a support bed, particularly if the stones are laid offset approximately mid-length thereof as illustrated in FIG. 5. Accordingly, as can be seen from FIGS. 5 and 6, when the precast concrete paver blocks are assembled together, they are disposed side-by-side and in interengagement with one another while permitting horizontal displacement but preventing vertical displacement as indicated by arrow 25 in FIG. 6 wherein the flat top walls 13 of the blocks lie in a substantially common planar surface, as illustrated by the axis 26 in FIG. 6. As shown in FIG. 6, and also as illustrated in FIGS. 1, 3 and 4, the spacer ridge formations 18 and the block engaging projections 15 are spaced a predetermined distance below the top wall 13 of the paver block whereby to form deep gaps or slots 27 all about each of the blocks to receive a filler material which will cause water to seep around the blocks in the slots 27 and propagate to a permeable support bed 28 which is formed with a flat top surface 29. The construction of an example of such a bed 28 will be described later with reference to FIG. 12 where the paver block 10 is a permeable block which, when assembled, forms a permeable monolithic surface.

An entire paving surface is assembled as illustrated in FIG. 5 wherein the blocks are interconnectable with one another through the block engaging projections 15 and slot 20 and spaced from one another by the spacer ridges 18 and 21. An advantage of this interconnection is that when a load is placed on a top surface of one or more of the paver blocks 10, this load is distributed to adjacent interconnectable paver blocks and resisting to displacement of the blocks by the load. For example, as shown in FIG. 5, if a load is applied on the surface of block A, the force generated by this load will be immediately distributed through its block engaging projections 15 and 15' to adjacent blocks C and B and to blocks F and E through their projections 15 and 15', respectively. Similarly, the forces in block F and E will be distributed to its interconnected blocks and this force propagates amongst surrounding blocks G and D through their interconnections. This transfer of force is indicated by arrows 30, 31, 30' and 31'. The transmission of loading in blocks C and B will then be transmitted into blocks D and G respectively as indicated by arrows 32 and 33, and through the block engaging projections 15' of block D and 15 of block G. For example, the force transmitted to block G would also be transmitted to block H, as indicated by arrow 36 through its block engaging projection 15'. Accordingly, the force propagates in the monolithic structure created by the interconnection of the paver blocks.

Tests have shown, as will be described later with reference to further graphs, that a load applied to a block, such as the block A has approximately up to 50 percent of its load dispersed to other interconnected surrounding paver blocks. This monolithic block interconnected structure prevents the displacement and disengagement of stone A on which a full load has been applied. Because of the interconnections of the blocks through their block engaging projections 15 and slots 20, the paved surface remains undisturbed by loads applied to a top surface of blocks, either vertically or in lateral torsion such as caused by the turning of vehicle tires on the paved surface.

As shown in FIG. 5, the paver blocks 10 are disposed in horizontal rows and are offset from one another. It is pointed out that the paver blocks may also be disposed in aligned relationship with one another, i.e., not offset. However, such an alignment does not provide surrounding interengagement and maximum load distribution as in the offset pattern of FIG. 5. Such an arrangement may be desired for a different application such as a walkway, edging, etc.

Figure 8:
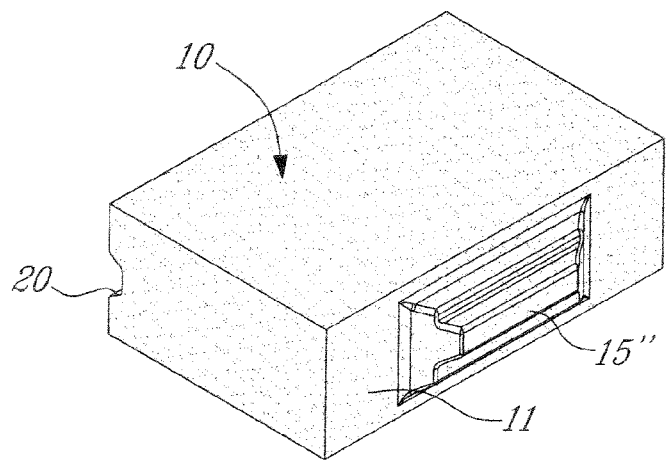
FIG. 8 is a perspective view of a precast concrete paver block showing a modification thereof wherein the block engaging projection is a single elongated projection.
Figure 9:
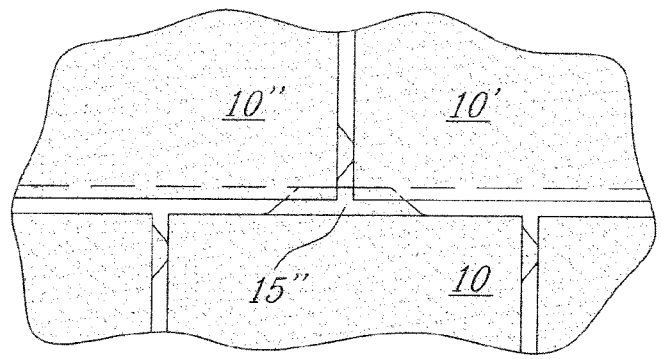
FIG. 9 is a fragmented top view showing the single elongated projection mated with two adjacent permeable precast interconnectable concrete paver blocks assembled offset therewith in a paved surface formed thereby.

Referring now to FIGS. 8 and 9, there is shown a modification of the block engaging projection, herein projection 15", wherein a single elongated projection is provided in the side wall 11 of the paver stone 10. This projection 15" is disposed substantially central of the length of the side wall 11. As shown in FIG. 9, when the blocks 10 are interconnected with one another, the projection 15" extends in end portions of the slots 20 of an adjacent pair of stones 10' and 10". However, it has been found that by using two block engaging projections 15 and 15', more torsional stability is achieved. Also, the joint filler material can propagate easier under two small projections rather than a longer central one.

Figure 10:
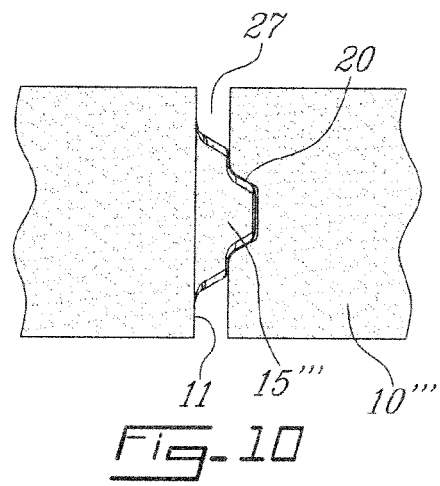
FIG. 10 is a fragmented cross-section view showing another example of the construction of the block engaging projection which has a longer projection and when mated with the slot of an adjacent block, automatically forms a gap or slot between the blocks.

FIG. 10 shows a further modification of the block engaging projection, herein projection 15'''. As shown in FIG. 10, the projection 15''' extends directly from the side wall 11 and there are no spacer ridge formations 18 in the surface of the side wall 11. The spacer ridge formation is integrally formed with the block engaging projection 15''' and has a longer projection whereby when interengaged with the slot 20 of an adjacent block, such as block 10''', the slot is created due to the fact that only an end portion of the projection 15''' is engaged in the slot 20. Accordingly, the longer projection of the block engaging projection 15''' provides the spacing or slot 27 between the stones. Again, this block engaging projection 15''' could be an elongated projection or a pair of spaced projections.

Figure 11:
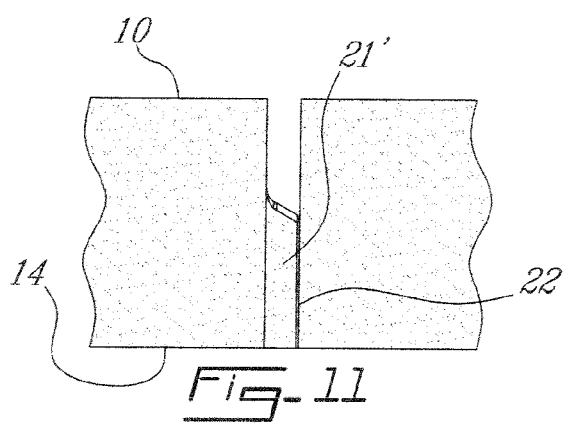
FIG. 11 is another fragmented section view showing a further modification wherein the spacer ridge formation in an end wall of one of the blocks extends to the bottom surface of the block to form a gap or slot between end walls of assembled blocks.

Referring now to FIG. 11, there is shown another modification, herein a modification of the space ridge formation 21'. As hereinshown the spacer ridge formation 21' is provided with a tapered top and opposed side edges and the spacer ridge extends to the bottom wall 14 of the paver stone 10 whereby there is no space formed under the ridge. The slope walls of the spacer ridges permit better distribution of the joint filler material.

Figure 12:
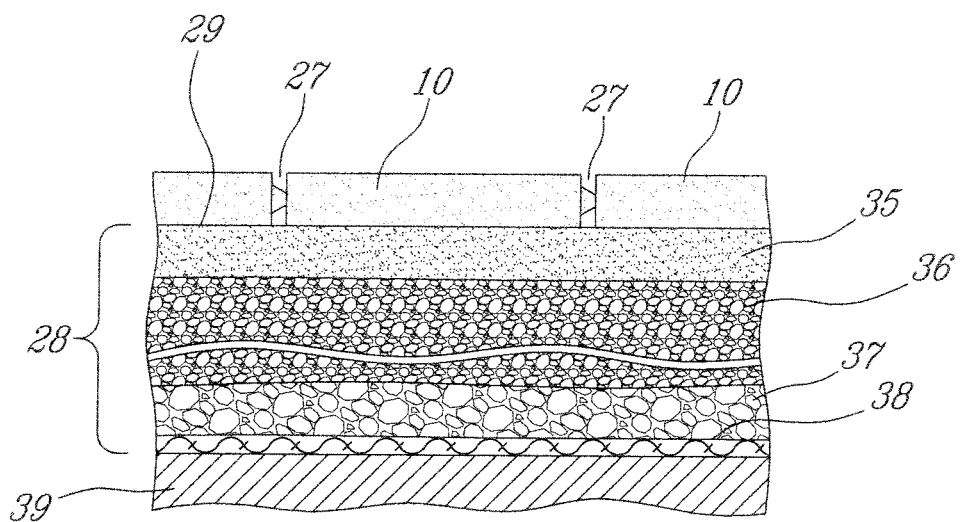
FIG. 12 is a section view showing the construction of a permeable bed on which a permeable paved surface formed with the interconnectable precast concrete paver blocks of the present is assembled.

Referring now to FIG. 12, there is shown a typical example of the construction of the support drainage bed 28. As hereinshown, the drainage bed 28 is comprised of a top aggregate layer 35 formed of fine aggregate, such as ⅜ inch clean stones, and this bed typically has a thickness of about 4 inches. There are no fines in this layer 35. This bed is supported on a sub-bed 36 which is formed with ballast stone typically 1 to 4 inches clean stones and has a depth of about 24 inches. The ballast stone bed 36 is disposed on a 2 inch bottom bed 37 formed of ⅜ inch clean stone and the purpose of this bed 37 is to provide protection of a geotextile fabric 38 which is disposed on the sub-soil or natural soil 39. The gaps or joints 27 are filled with a joint filler, herein comprised of ¼ inch clean stone which is swept therein. The entire paved surface is then vibrated with a vibrating machine, well known in the construction of paving surfaces using paving blocks, to propagate the filler material in the interstices between the slots and under the spacers and projections. Further filler material is again added until a substantially uniform surface is obtained in the joints.

Figure 13:
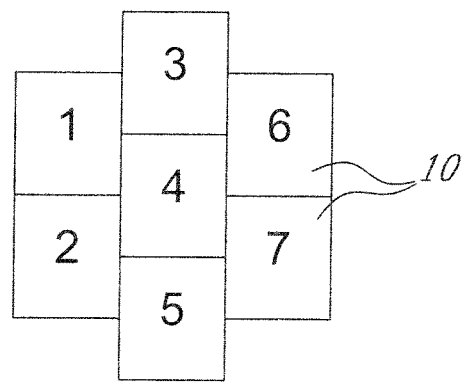
FIG. 13 is a top view showing seven interconnectable precast concrete paver blocks formed in accordance with the present invention and interconnected offset from one another to illustrate the distribution of forces among adjacent blocks.
Figures 14, 15:
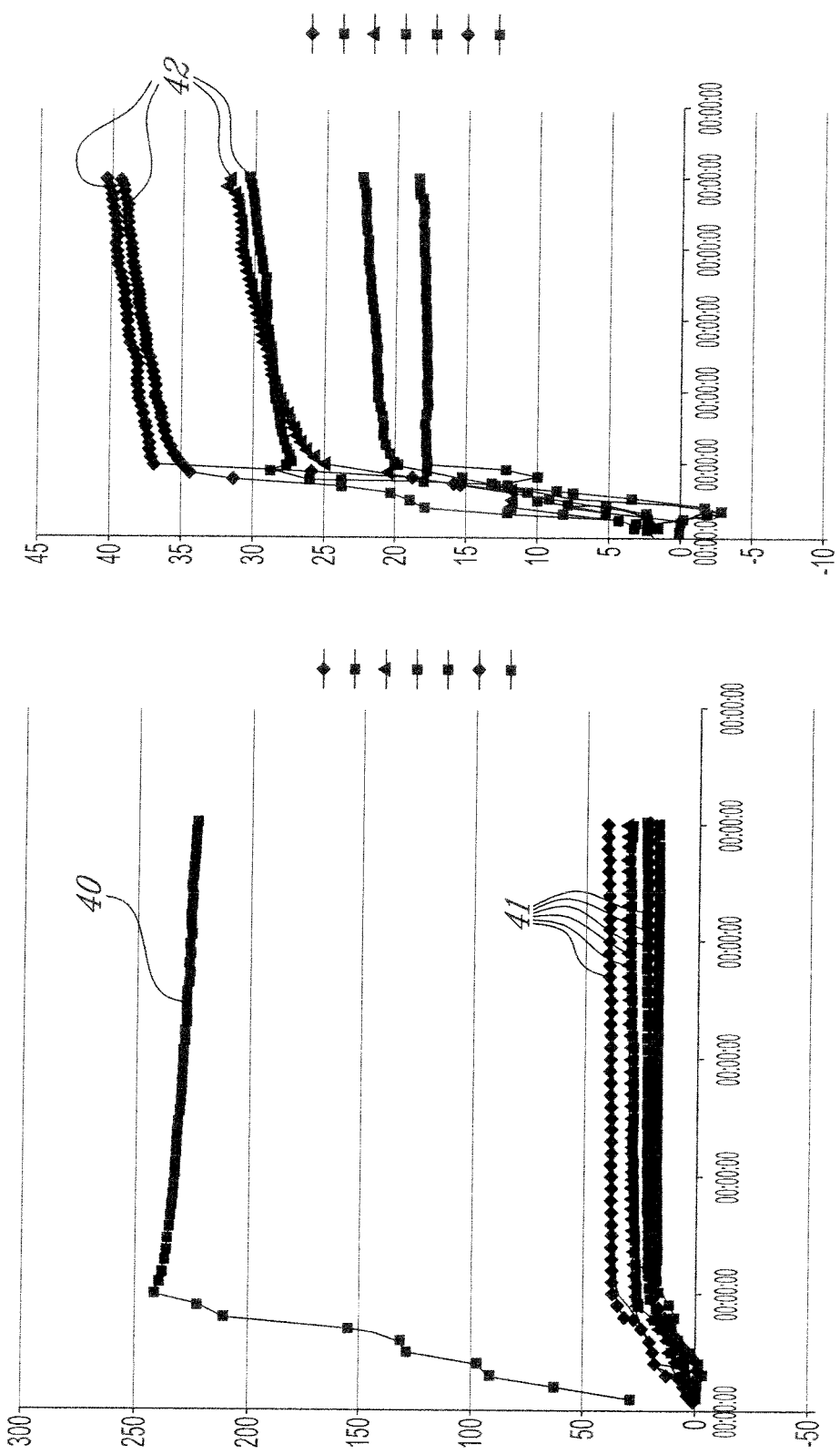
FIG. 14 is a graph showing load distribution of conventional prior art blocks assembled as in FIG. 13 wherein there are no interconnections between the blocks and showing the effect of a load placed on the central block.
FIG. 15 is a further graph illustrating the distribution of the same load, when applied to the central block, amongst surrounding blocks interconnected with one another and wherein the load on the central block can be reduced by up to 50 percent due to the distribution of the load amongst surrounding blocks.

FIGS. 13 to 15 illustrate tests that have been made on a paved surface formed with the precast concrete paver blocks 10 of the present invention and interengaged to one another in an offset disposition as shown in FIG. 13. First, tests were made with paver blocks of identical sizes without interconnection features of the present invention, that is to say without engaging projections interengaged in slots of adjacent blocks. Each of the paver blocks was provided with a load detecting and measuring cell thereunder. A vertical load was applied to the central block, herein identified by reference numeral 4. The result of the load distribution amongst surrounding blocks is illustrated in FIG. 14 wherein it is noted that most of the load applied to block 4 remained on the block. This load is indicated by the curve 40. The surrounding blocks indicated by curves 41 absorb very little loading. The small force transmission was due to friction with the central block 4.

However, when the precast concrete paver blocks 10 of the present invention were used in interconnection, as shown in FIG. 13, the distribution of load from block 4 on adjacent blocks was remarkably different as illustrated by the curves 42 as shown in FIG. 15. These curves are associated with symbols indicating the load distribution on the surrounding blocks 1, 2, 3, 5, 6 and 7. It is therefore conclusive that the precast concrete paver block 10 of the present invention, when assembled with like paver blocks to form a permeable paved surface, provides a monolithic structure that distributes load forces amongst a much larger surface area than conventional paving surfaces formed with standard paver blocks which are not interconnected in the vertical plane. About 50 percent of the load is shown distributed to surrounding interconnected blocks.

Figure 16A:
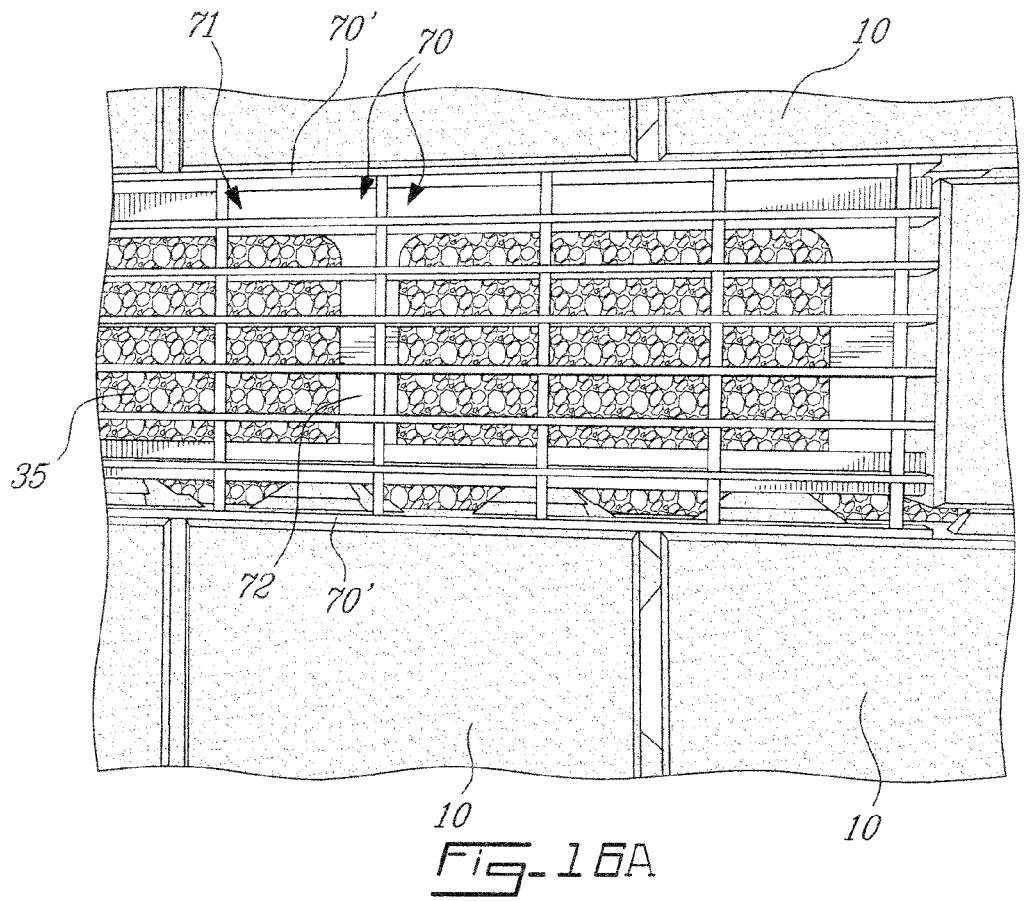
FIG. 16A is a perspective view of a culvert structure for assembly with the blocks of the present invention.
Figure 16B:
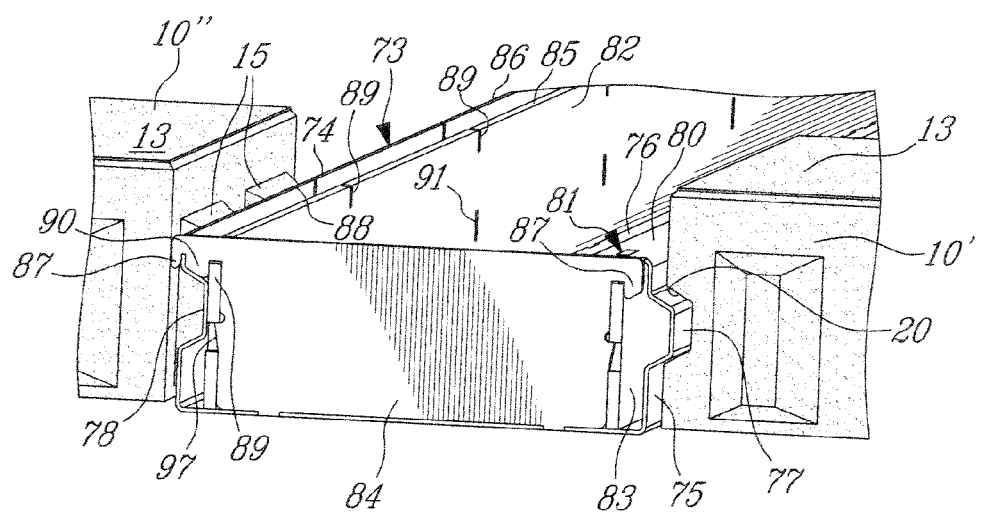
FIG. 16B is a fragmented perspective end view of the culvert structure incorporated in a paved surface with the blocks of the present invention.
Figure 16C:
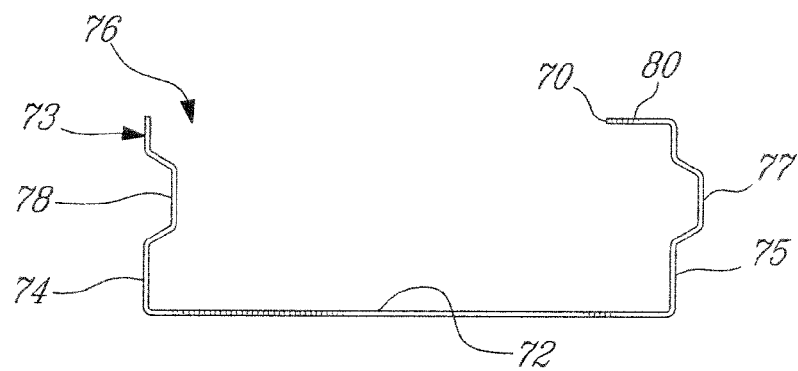
FIG. 16C is an end view of the culvert casing.
Figure 16D:
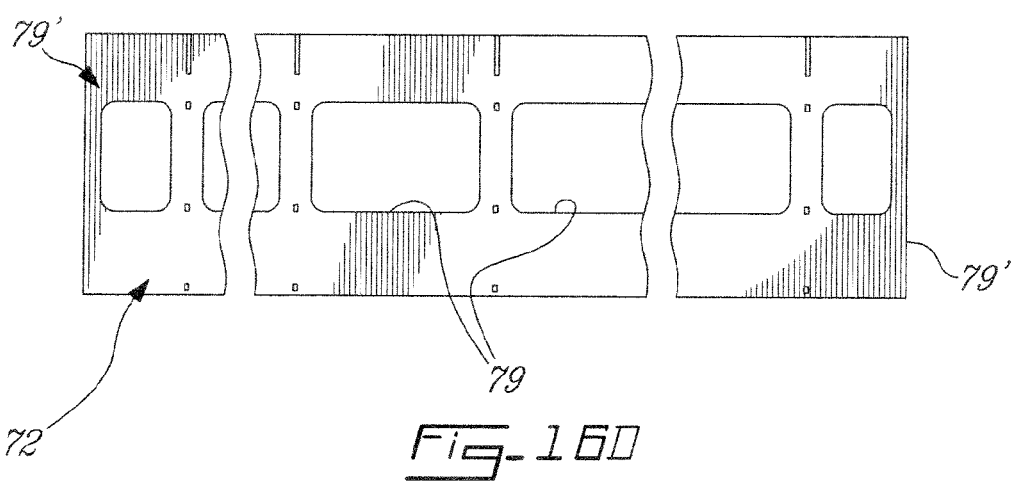
FIG. 16D is a top view of the casing bottom wall.

Referring now to FIGS. 16A to 16E, there will be described the construction of a culvert structure which is integratable in an interconnected manner with a paved surface formed with the interconnectable concrete paver blocks of the present invention. The culvert structure is partly illustrated by the fragmented overhead perspective view of FIG. 16A and as hereinshown the culvert structure 70 is resting on the aggregate layer 35 of a drainage bed such as that shown in FIG. 12. A grate 71 is supported on top of the culvert structure 70 and flush with the top surface of the surrounding paver blocks 10 of the present invention. The culvert structure 70 also interconnects with the projections 15 and slot 60 of adjacent blocks 10 on opposed elongated sides 70' thereof. The culvert structure 70 is constructed as an elongated rigid casing having a bottom wall 72 as shown in FIG. 16D and provided with large openings 79 for the passage of water therethrough.

With reference now more specifically to FIGS. 16B and 16C, the elongated rigid casing 73 is formed of galvanized steel shaped to define opposed parallel vertical side walls 74 and 75 and defines an open top end 76. One of the vertical side walls, herein side wall 75, is formed with an elongated horizontal projection formation 77 for interconnection with the slot 20 of adjacent paver block 10'. The projection formation 77 is shaped for close fit engagement within the slot 20 of the adjacent paver block 10'.

The other of the vertical side walls, namely side wall 74, is provided with a slot formation 78 for interconnection with the block engaging projections 15 of an adjacent paver block 10" of a paved surface formed by these paver blocks 10 interconnected together as described hereinabove.

As shown in FIGS. 16B and 16C, the side wall 75 is provided with a flat top support ledge 80 on which the grate 71 is supported. This top ledge 80 is further provided with connecting holes 81 for interconnection with intermediate spacer plates, as will be described later.

The culvert structure 70 is also provided with a support structure for supporting the grate 70. This support structure comprises a pair of vertical support plates 82 and 83 interconnected together spaced apart by transverse interconnecting end spacer plates 84, only one being shown in FIG. 16B, but an identical one being connected at the other end. The vertical support plates rest on the bottom wall 72 of the elongated rigid casing and have a top support edge 85, only one being shown herein, recessed a predetermined distance below the top edge 86 of the opposed vertical side walls 74 and 75. They accordingly form a recess support ledge for the grate 70 whereby the grate upper surface is flush with the top surface 13 of the surrounding paver blocks 10 of the present invention.

As shown in FIG. 16B, the end spacer plates 84 are formed with hook formations 87 having slots 89 at opposed top ends thereof for interconnecting with to top edge of the support plates 82 and 83. Engaging prongs 84' extend from the bottom edge 84" of the end spacer plate 84 for snap fit engagement in channels 79' formed in the end edges of the bottom wall 72. A projecting finger 97 engages an open ended slot 91' formed in the vertical support plates 82 and 83. These end plates abut the transverse side walls 12 and 12' of the blocks 10 when assembled therewith. Accordingly, the pair of vertical support plates 82 and 83 are interconnected with the opposed parallel vertical side walls 74 and 75 of the casing 70 through the end plates 84 and spaced in parallel relationship inwardly therefrom.

Figure 16E:
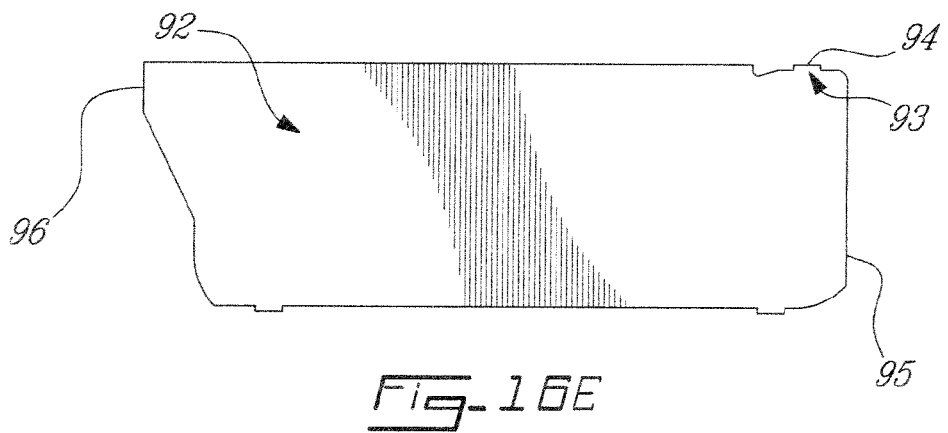
FIG. 16E is a plan view of the paver support plates.

Additional vertical connecting slots 91 are formed in alignment with the slots 89 and these are provided for the removable interconnection of spacer plates 92 as shown in FIG. 16E. These intermediate connecting slots 89 and 91 and intermediate spacer plates 92 provide for a rigid grate support structure for the grate 71. The spacer plate 92 is provided with an interengaging end formation 93 having a projection prong 94 for engagement into the connecting hole 81 in the ledge 80. The and edge 95 is a straight vertical edge and fits under the ledge 80 and abuts the straight vertical portions of the side wall 75 under the ledge. Accordingly, this spacer plate is inserted at a tilt angle to position the end formation 93 under the ledge 80 and then push inwardly whereby the projecting end 96 protrudes into the slot 89. The slots 91 are adapted to receive a projecting finger 97 formed in the end spacer plates 84 to interconnect further spacer plates between the vertical support plates 82 and 83.

It is pointed out that the culvert structure has a length of 10 feet and these intermediate spacer plates 92 and end spacer plates 82 provide reinforcement therealong.

Figure 17A:
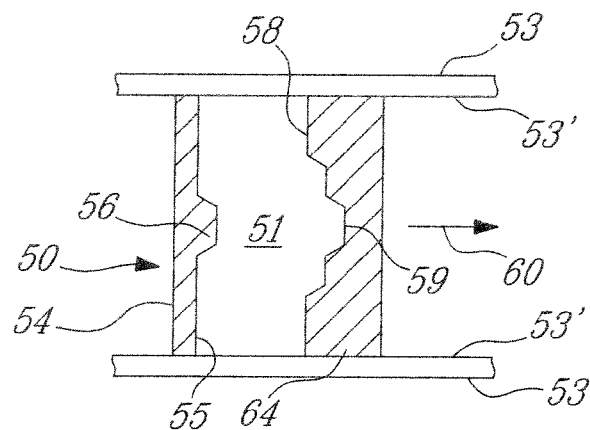
FIG. 17A is a top view of a vertical mould for casting the paving block of the present invention.

As shown in FIG. 17A, the vertical mould 50 for casting the paver block 10 of the present invention comprises a displaceable support plate 51, herein a steel plate having a flat top surface 52. At least one pair of vertically displaceable mould side plates 53 are disposed parallel to one another and each have a flat mould forming inner side wall 53' which face one another. A vertically displaceable rear plate 54 having a flat mould inner side wall 55 is provided with at least one slot forming projection 56 extending thereon vertically at a predetermined location. The rear plate 54 extends transversely between the pair of displaceable mould side plates 53 and in contact with the mould forming inner side walls 53'.

Figure 17B:
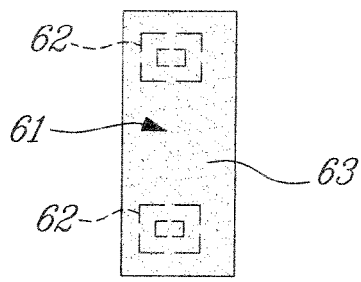
FIG. 17B is a top view of the top wall of the mould.

A vertically displaceable front plate 57 also has a flat mould inner side wall 58 with at least one block engaging projection forming cavity 59 therein. The displaceable front plate 54 also extends transversely between the pair of displaceable mould side plates 53 and in contact with the mould forming inner side walls 53'. The front plate 54 is displaceable laterally in the direction of arrow 60 to open the vertical mould after casting the permeable paving block. A top horizontal plate 61, as shown in FIG. 17B, is provided with at least one, herein two, spacer forming cavities 62 in the inner face 63 thereof and shaped to mould the spacer ridges 21 as shown in FIG. 4. The top plate 61 is displaceable vertically to be positioned inside a top open end of the vertical mould 50 which is formed by the mould side plates 53, rear plate 64 and front plate 65. The flat top surface 52 of the support plate 51 forms the bottom wall of the mould. After casting the mould with a predetermined quantity of concrete which is specifically mixed to form a sustainable casted stone, the front plate 64 is retracted in the direction of arrow 60 and the side plates, rear plate and top plate are then displaced upwardly to expose a casted permeable paving block supported vertically on the flat end wall 12' thereof. The reason for casting the permeable paving stone in this fashion is that any variation in the dimension of the paver blocks, due to small variations in the volume of concrete placed in the mould, resides in small variations in the length of the block between opposed end walls thereof. Accordingly, the thickness of the stone is moulded with very precise tolerances whereby any variation in dimension will be along the length of the block and not in the thickness. Accordingly, the casting provides for interconnecting paving blocks which have their upper surface substantially perfectly aligned in a common planar surface.

Figure 18:
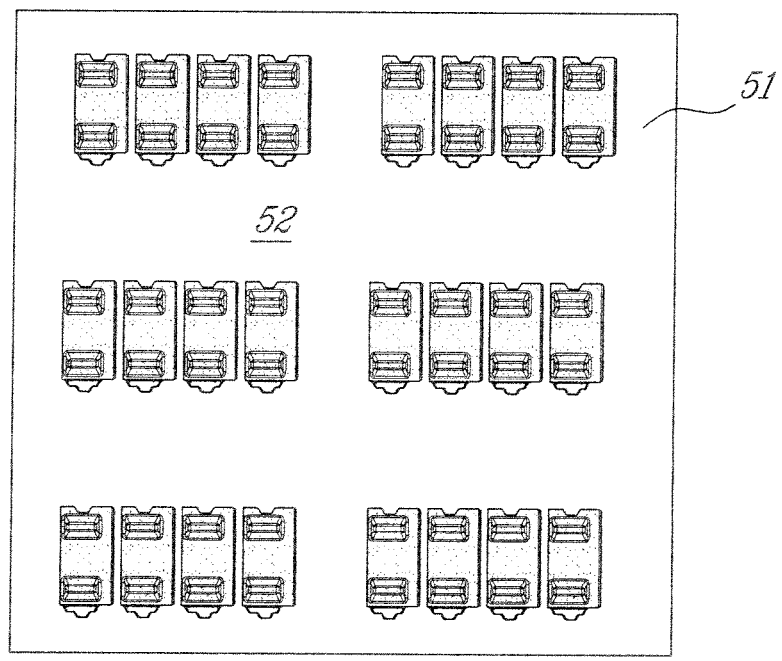
FIG. 18 is a top view of a support plate on which has been molded a plurality of vertically disposed permeable paving blocks.

As shown in FIG. 18, a plurality of these paver blocks are casted in one operation on the support plate 51. The support plate 51 is then transported to a location for curing the paver blocks 10. The paver blocks are than manipulated for stacking on shipping pallets as is conventional with the casting of paving blocks.

It is within the ambit of the preset invention to cover any obvious modifications of the preferred embodiment described herein and examples of modifications thereof, provided such modifications fall within the scope of the appended claims.

I claim:

1. A precast concrete paver block for assembly with other like paver blocks to form a paved surface, said precast concrete paver block being a solid core block having a first pair of flat parallel side walls and a second pair of transverse parallel side walls, one side wall of said first pair of parallel side walls having at least one block engaging projection in at least one or more portions of said one side wall and disposed between a top and bottom surface of said paver block, the opposed side wall of said first pair of side walls having a slot to receive in close sliding fit said at least one said block engaging projection of an adjacent one of said paver blocks for side-by-side interengagement while permitting horizontal displacement of said adjacent paver block and said block engaging projection thereof while preventing vertical displacement thereof in said slot wherein a top face of said paver blocks lie in a substantially common planar surface, spacer means formed integral in a base portion of said at least one block engaging projection, further spacer means is integrally formed in a portion only of one side wall of said second pair of said transverse parallel side walls, said paver block when assembled with further of said paver blocks in interconnected engagement on a support bed providing open-joint areas about said paver blocks extending from said top surface to said support bed.

2. A precast concrete paver block as claimed in claim 1 wherein said block engaging projection has opposed top and bottom tapering walls converging inwardly towards one another to a free end thereof.

3. A precast concrete paver block as claimed in claim 2 wherein said slot is dimensioned and formed to receive at least an end portion of said block engaging projection in close fit therein.

4. A precast concrete paver block as claimed in claim 3 wherein said slot is a through slot extending between said second pair of flat transverse parallel side walls, said block engaging projection being slidingly displaceable along said slot in close fit therein.

5. A precast concrete paver block as claimed in claim 2 wherein there are two or more of said block engaging projections spaced-apart from one another.

6. A precast concrete paver block as claimed in claim 2 wherein said block engaging projection is an elongated block engaging projection.

7. A precast concrete paver block as claimed in claim 2 wherein said block engaging projection has inwardly tapering opposed vertical end walls.

8. A precast concrete paver block as claimed in claim 4 wherein said slot is spaced inwardly between said top and bottom surface of said paver block, and a flat abutment surface extending along said opposed side walls of said first pair of side walls above and below said slot, said slot and block engaging projection being aligned on a common horizontal axis of said precast concrete paver block.

9. A precast concrete paver block as claimed in claim 1 wherein said further spacer means is constituted by at least one ridge formation projecting from said one side wall of said second pair of flat transverse parallel side walls, said ridge formation having a flat abutment surface at a free end thereof extending parallel to said one side wall of said flat transverse parallel side walls.

10. A precast concrete paver block as claimed in claim 9 wherein there are two of said ridge formations projecting from said one side wall of said second pair of flat transverse parallel side walls, said two ridge formations being spaced from one another.

11. A precast concrete paver block as claimed in claim 9 wherein said at least one ridge formation is spaced a predetermined distance below said top wall of said paver block and extends to said bottom wall of said paver block.

12. A precast concrete paver block as claimed in claim 1 interlocked in side-by-side relationship with a plurality of said precast concrete paver blocks and interengaged with one another by said block engaging projection of said blocks projecting into said slot of adjacent blocks wherein a load placed on a top surface of one or more of said blocks is distributed to adjacent interengaged blocks.

13. A precast concrete paver block as claimed in claim 12 wherein said paver blocks are disposed in rows of paver blocks with said paver blocks of adjacent rows being interengaged with one another by said block engaging projections.

14. A precast concrete paver block as claimed in claim 13 wherein said blocks in said rows are offset from said blocks in adjacent rows with said paver block engaging projection of each said paver blocks projecting in said slot of two adjacent paver blocks of an adjacent one of said rows of paver blocks.

15. A precast concrete paver block as claimed in claim 14 wherein said load placed on a top surface of one of said paver blocks is distributed to all immediately surrounding paver blocks through said block engaging projections of said one of said paver blocks and said immediately surrounding paver blocks.

16. A precast concrete paver block as claimed in claim 15 wherein there are two of said block engaging projections spaced-apart from one another, said paver blocks are offset with paver blocks of adjacent rows at substantially mid-distance of said paver blocks, said two of said block engaging projections of one of said paver blocks extending into the slot of two adjacent paver blocks of an adjacent row of said paver blocks whereby said load is distributed radially outwards about said one of said paver blocks.

17. A precast concrete paver block as claimed in claim 16 wherein said interengaged paver blocks are permeable paver blocks positioned on a support drainage bed, said spacer means and further spacer means forming a drainage joint about said paver blocks, and a clean filler material in said drainage joint to evacuate water through said drainage joint and into said support drainage bed while substantially preventing foreign matter to propagate to said drainage bed and/or obstruct said drainage joint.

18. A precast concrete paver block as claimed in claim 17 wherein said clean filler material is clean stone having an average size of about ¼ inch, said drainage joint having a width of 13 mm, said stones being rectangular stones having a length of 287 mm and a width of 187 mm.

19. A precast concrete paver block as claimed in claim 1 in combination with a culvert structure, said culvert structure comprising an elongated rigid casing having a bottom wall, opposed parallel vertical side walls, and an open top end; one of said vertical side walls having at least one projection formation for interconnection with said slot of an adjacent one of said paver blocks in said paved surface, the other of said vertical side walls having a slot formation for interconnection with said paver blocks engaging projection of an adjacent one of said block in said paved surface, said bottom wall having passage means for the evacuation of water therethrough and a support structure connected to said rigid casing for supporting a grate over said open top end.

20. A precast concrete paver block as claimed in claim 19 wherein said projection formation is an elongated formation extending along said one of said vertical side wall and shaped for close fit engagement in said slot of said adjacent paver block.

21. A precast concrete paver block as claimed in claim 19 wherein said support structure comprises a pair of vertical support plates interconnected together spaced apart by transverse interconnecting spacer plates, said vertical plates resting on said bottom wall and having a top support edge extending a predetermined distance bellow a top edge of said opposed parallel vertical side walls and spaced inwardly therefrom to form a recessed support ledge for said grate.

22. A precast concrete paver block as claimed in claim 21 wherein said vertical support plates are provided with vertical connecting slots for interengagement with said spacer plates.

23. A precast concrete paver block as claimed in claim 22 wherein intermediate ones of said connecting slots are formed in said vertical support plates and disposed in transverse alignment with one another, and intermediate spacer plates for interengagement with said intermediate ones of said connecting slots.

24. A precast concrete paver block as claimed in claim 19 wherein one of said vertical side walls is provided with a support ledge having spacer plate engaging means for interconnection with said spacer plates and intermediate spacer plates.

25. A precast concrete paver block for assembly with other like paver blocks to form a paved surface, said precast concrete paver block being a solid core block having a first pair of flat parallel side walls and a second pair of transverse parallel side walls, one side wall of said first pair of parallel side walls having at least one block engaging projection in at least one or more portions of said one side wall and disposed between a top and bottom surface of said paver block, the opposed side wall of said first pair of side walls having a slot to receive in close sliding fit said at least one said block engaging projection of an adjacent one of said paver blocks for side-by-side interengagement while permitting horizontal displacement of said adjacent paver block and said block engaging projection thereof while preventing vertical displacement thereof in said slot wherein a top face of said paver blocks lie in a substantially common planar surface, spacer means formed integral in a base portion of said at least one block engaging projection, further spacer means is integrally formed in a portion only of one side wall of said second pair of said transverse parallel side walls, said paver block when assembled with further of said paver blocks in interconnected engagement on a support bed providing open-joint areas about said paver blocks extending from said top surface to said support bed, and wherein said block engaging projection has opposed top and bottom tapering walls converging inwardly towards one another to a free end thereof, said slot being a through slot being dimensioned and formed to receive at least an end portion of said block engaging projection in close fit therein, said through slot extending between said second pair of flat transverse parallel side walls, said block engaging projection being slidingly displaceable along said through slot in close fit therein, said through slot being spaced inwardly between said top and bottom surface of said paver block, and a flat abutment surface extending along said opposed side walls of said first pair of side walls above and below said slot, said slot and block engaging projection being aligned on a common horizontal axis of said precast concrete paver block.

26. A precast concrete paver block for assembly with other like paver blocks to form a paved surface, said precast concrete paver block being a solid core block having a first pair of flat parallel side walls and a second pair of transverse parallel side walls, one side wall of said first pair of parallel side walls having at least one block engaging projection in at least one or more portions of said one side wall and disposed between a top and bottom surface of said paver block, the opposed side wall of said first pair of side walls having a slot to receive in close sliding fit said at least one said block engaging projection of an adjacent one of said paver blocks for side-by-side interengagement while permitting horizontal displacement of said adjacent paver block and said block engaging projection thereof while preventing vertical displacement thereof in said slot wherein a top face of said paver blocks lie in a substantially common planar surface, spacer means formed integral in a base portion of said at least one block engaging projection, further spacer means is integrally formed in a portion only of one side wall of said second pair of said transverse parallel side walls, said paver block when assembled with further of said paver blocks in interconnected engagement on a support bed providing open-joint areas about said paver blocks extending from said top surface to said support bed, said precast concrete paver block being interlocked in side-by-side relationship with a plurality of said precast concrete paver blocks and interengaged with one another by said block engaging projection of said blocks projecting into said slot of adjacent blocks wherein a load placed on a top surface of one or more of said blocks is distributed to adjacent interengaged blocks, said paver blocks being disposed in rows of paver blocks with said paver blocks of adjacent rows being interengaged with one another by said stone engaging projections, said paver blocks in said rows being offset from said blocks in adjacent rows with said paver block engaging projection of each said paver blocks projecting in said slot of two adjacent paver blocks of an adjacent one of said rows of paver blocks, said load placed on a top surface of one of said paver blocks being distributed to all immediately surrounding paver blocks through said block engaging projections of said one of said paver blocks and said immediately surrounding paver blocks, and wherein there are two of said block engaging projections spaced-apart from one another, said paver blocks are offset with paver blocks of adjacent rows at substantially mid-distance of said paver blocks, said two of said block engaging projections of one of said paver blocks extending into the slot of two adjacent paver blocks of an adjacent row of said paver blocks whereby said load is distributed radially outwards about said one of said paver blocks.

* * * * *